US008291368B2

(12) United States Patent
Verma et al.

(10) Patent No.: US 8,291,368 B2
(45) Date of Patent: Oct. 16, 2012

(54) METHOD FOR REDUCING SURFACE AREA OF PAD LIMITED SEMICONDUCTOR DIE LAYOUT

(75) Inventors: Chetan Verma, Noida (IN); Sumeet Aggarwal, Delhi (IN); Meng Kong Lye, Shah Alam (MY)

(73) Assignee: Freescale Semiconductor, Inc., Austin, TX (US)

( * ) Notice: Subject to any disclaimer, the term of this patent is extended or adjusted under 35 U.S.C. 154(b) by 21 days.

(21) Appl. No.: 13/020,814

(22) Filed: Feb. 4, 2011

(65) Prior Publication Data

US 2011/0246958 A1 Oct. 6, 2011

(30) Foreign Application Priority Data

Apr. 5, 2010 (IN) .............................. 821/DEL/2010

(51) Int. Cl.
*G06F 17/50* (2006.01)
(52) U.S. Cl. ...................... 716/135; 716/110; 716/119
(58) Field of Classification Search .................. 716/110, 716/112, 119, 135

See application file for complete search history.

(56) References Cited

U.S. PATENT DOCUMENTS

| 5,245,214 | A | 9/1993 | Simpson |
| 5,468,999 | A | 11/1995 | Lin |
| 5,498,767 | A | 3/1996 | Huddleston |
| 5,719,449 | A | 2/1998 | Strauss |
| 5,962,926 | A | 10/1999 | Torres |
| 7,194,707 | B2 * | 3/2007 | Chung-Maloney et al. .. 257/203 |
| 2010/0123252 | A1 * | 5/2010 | Ushiyama ...................... 257/773 |
| 2011/0260318 | A1 * | 10/2011 | Eisenstadt ..................... 257/737 |

* cited by examiner

*Primary Examiner* — Nghia Doan
*Assistant Examiner* — Mohammed Alam
(74) *Attorney, Agent, or Firm* — Charles Bergere (57) ABSTRACT

A method for reducing a surface area of a pad limited semiconductor die layout includes choosing an outer die pad row from a group of outer die pad rows on the semiconductor die, each of the outer die pad rows being adjacent an edge of the semiconductor die. Next, the method performs selecting, from the outer die pad row, a common die pad group with die pads that are arranged to be electrically connected to an external connection pad. The method then performs repositioning a subgroup of the common die pad group on an inner die pad row, the inner pad row being adjacent the outer die pad row. After he repositioning there is performed a step of adjusting positions of at least some of the remaining pads in the outer die pad row thereby reducing an overall length of the outer die pad row. The method then provides for repeating the above steps until the surface area of a pad limited semiconductor die cannot be reduced any further by the step of adjusting positions or until every common die pad group, on every one of the outer die pad rows, has been selected by the selecting step.

20 Claims, 7 Drawing Sheets

METHOD FOR REDUCING SURFACE AREA OF PAD LIMITED SEMICONDUCTOR DIE LAYOUT

BACKGROUND OF THE INVENTION

The present invention relates to reducing the surface area of a pad limited semiconductor die layout. More specifically, the present invention relates to a method for reducing surface area of a pad limited semiconductor die layout by repositioning die pads of a common die pad group.

Typical semiconductor packages have a die that can perform complex and high speed data processing. Consequently, there is often a need for such packages to have a relatively large number of external connection pads. These connection pads are often wire bonded to input/output terminals in the form of die pads that are disposed around the periphery (edges) of the die. When low impedance or high current wire bonds are required, there are often a group of die pads wire bonded to a respective common external connection pads. As a result, the area (overall die size) of a semiconductor die may be determined by the number of die pads disposed around the periphery instead of the number of transistors forming the core or active area of the die.

When the overall die size is determined by the number of die pads, the semiconductor die is classified as a pad limited semiconductor die as opposed to core limited die which is generally limited by the number of transistors forming the core or active area of the die. Some semiconductor devices have a single row of die pads with a constant pad pitch pads disposed around the periphery of the die. The constant pad pitch is determined by the worst case packaging requirements of the semiconductor device. Furthermore, the worst case pad pitch spacing (minimum pad or bond wire pitch) is used to determine how many uniformly spaced pads fit along an edge of a semiconductor die. The problem with using a single row of bond pads that are uniformly spaced is that it can cause unnecessarily large pad limited semiconductor die sizes. In addition, even if multi-rows of bond pads are used on each side of the semiconductor die, die area reduction may not be possible because designers are required to follow design rules that specify the minimum bond wire spacing between adjacent bond wires.

BRIEF DESCRIPTION OF THE DRAWINGS

The invention, together with objects and advantages thereof, may best be understood by reference to the following description of preferred embodiments together with the accompanying drawings in which.

DETAILED DESCRIPTION OF PREFERRED EMBODIMENTS

The detailed description set forth below in connection with the appended drawings is intended as a description of presently preferred embodiments of the invention, and is not intended to represent the only forms in which the present invention may be practiced. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that system, circuit, device components and method steps that comprises a list of elements or steps does not include only those elements but may include other elements or steps not expressly listed or inherent to such system, circuit, device components or steps. An element or step proceeded by "comprises . . . a" does not, without more constraints, preclude the existence of additional identical elements or steps that comprises the element or step.

In one embodiment the present invention provides a method for reducing a surface area of a pad limited semiconductor die. The method includes choosing an outer die pad row from a group of outer die pad rows on the semiconductor die, each of the outer die pad rows being adjacent an edge of the semiconductor die. Next, the method performs selecting, from the outer die pad row, a common die pad group with die pads that are arranged to be electrically connected to an external connection pad. The method then performs repositioning a subgroup of the common die pad group on an inner die pad row, the inner pad row being adjacent the outer die pad row. After repositioning a step of adjusting positions of at least some of the remaining pads in the outer die pad row thereby reducing an overall length of the outer die pad row is performed.

The method then provides for repeating the above steps until the surface area of a pad limited semiconductor die cannot be reduced any further by the step of adjusting positions or until every common die pad group, on every one of the outer die pad rows, has been selected by the selecting step.

Figure 1:
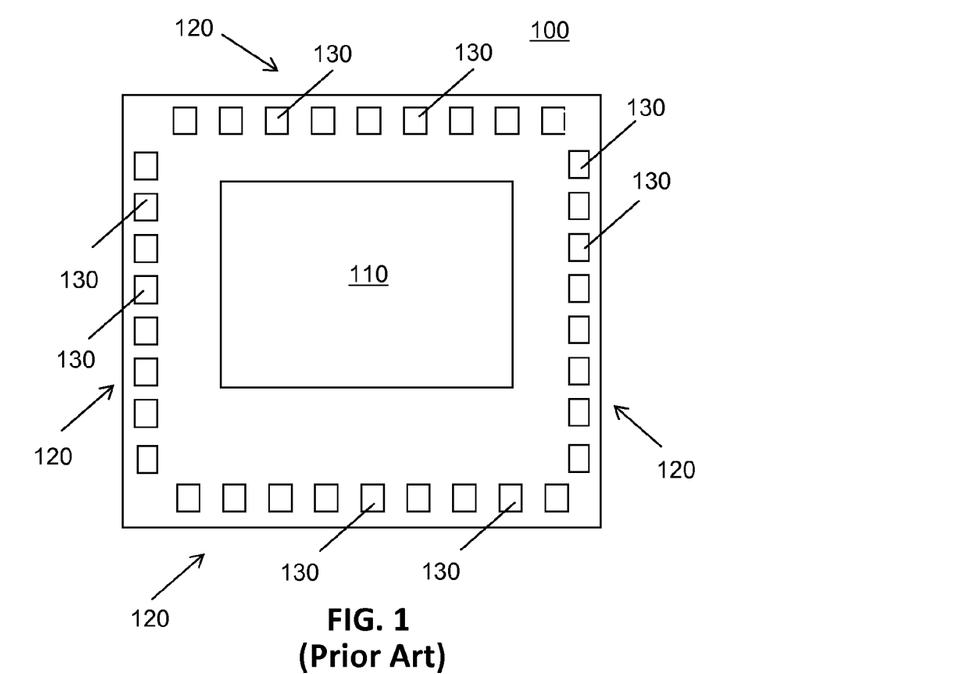
FIG. 1 is a plan view of a conventional pad limited semiconductor die.

Referring to FIG. 1 there is illustrated a plan view of a prior art pad-limited semiconductor die 100. As shown, the semiconductor die 100 has an active area or core area 110 and spaced from the core area 110 are pad rows 120 comprising die pads 130. Clearly, the lengths of the pad rows 120 determine the surface area of the die 100 and if some of the die pads 130 were removed then the surface area of the semiconductor die 100 could be reduced.

Figure 2:
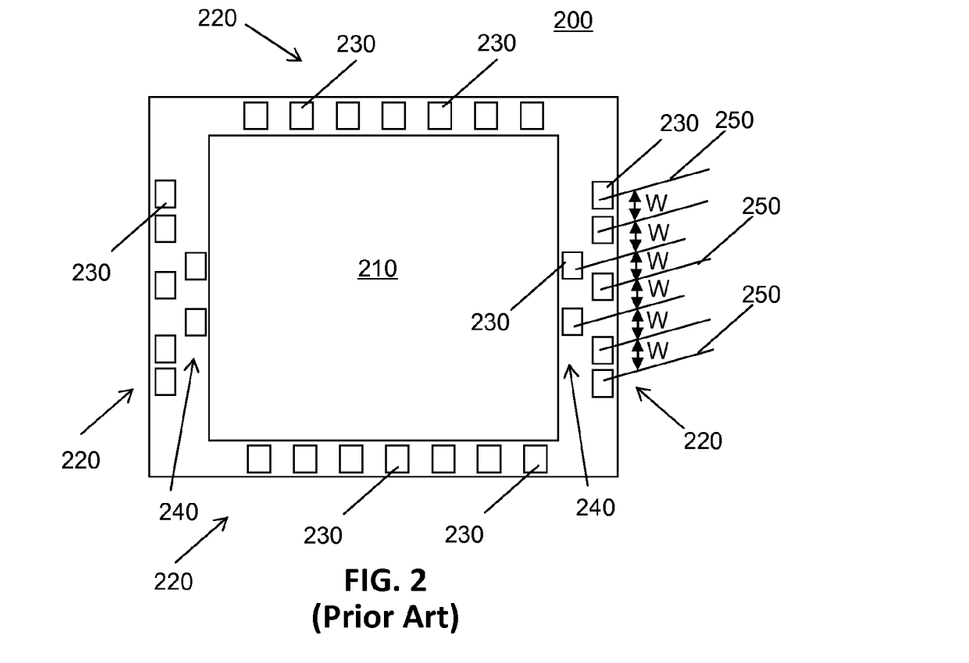
FIG. 2 is a plan view of a conventional core limited semiconductor die.

Referring to FIG. 2 there is illustrated a plan view of a prior art core limited semiconductor die 200. As shown, the semiconductor die 200 has an active area or core area 210 and adjacent to the core area 110 are pad rows 220 comprising die pads 230. As shown, the core area 210 determines the surface area of the die 200 and if some of the die pads 230 were removed then the surface area of the semiconductor die 100 could be unchanged. In this illustration, the semiconductor die 100 has inner pad rows 240 on two sides. Sections of wire bonds 250 are shown bonded to some of the pads 230 in which all pads 230 of the inner pad rows 240 and outer pad rows 220 are positioned (spaced) to maintain a minimum bond wire pitch W. Because of this need to maintain a minimum bond wire pitch W, die area reduction cannot be affected since the pad re-positioning in the outer row is still dictated by the minimum bond wire pitch W. Hence, the length of the outer edges cannot be reduced because of this limitation.

Figure 3:
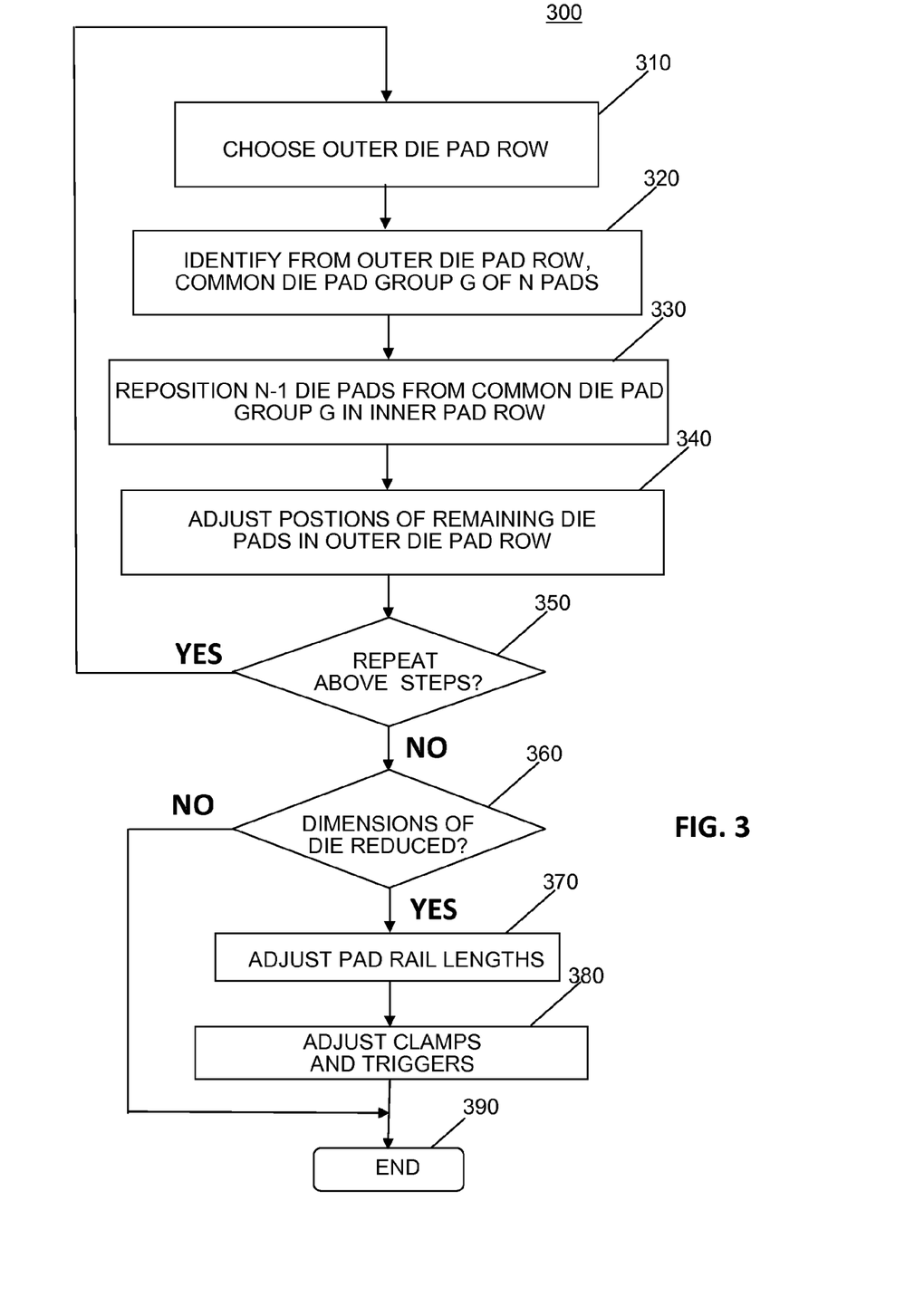
FIG. 3 is a is a flow chart illustrating a method for reducing a surface area of a pad limited semiconductor die layout in accordance with a preferred embodiment of the present invention.

Referring to FIG. 3 there is a flow diagram illustrating a method 300 for reducing a surface area of a pad limited semiconductor die layout in accordance with a preferred embodiment of the present invention. The method 300 starts at a choosing block 310 where a step of choosing an outer die pad row from a group of outer die pad rows on the semiconductor die, each of the outer die pad rows being adjacent an edge of the semiconductor die is performed. In this regard, the semiconductor die can be a dual pad device comprising two opposite die pad rows adjacent to opposing edges of the semiconductor die or a quad pad device with die pad rows adjacent to every edge of the semiconductor die. In one embodiment, the choice of the choosing block 310 is characterized by choosing a longest outer die pad row from the group of die pad rows, where the longest die pad row is the die pad row with the most die pads. However, if all the die pad rows have an equal number of die pads then one of the die pad rows is chosen randomly.

A step of selecting is performed at a selecting block 320. During the step of selecting there is selected, from the outer die pad row, a common die pad group G with die pads that are arranged to be electrically connected to an external connection pad. Typically, the common die pad group G comprises power supply die pads that are positive supply pads or ground pads. However, the common die pad group G may include signal or data die pads that require low impedance wire bonding.

The process of selection of the selecting block 320 prioritizes the selection of a common die pad group G that has the most die pads in the outer die pad row. Furthermore, the common die pad group G is a group of N die pads where N is typically an integer of at least two.

The method 300 next performs, at a repositioning block 330, a repositioning a subgroup of N−1 die pads of the die pad group G on an inner die pad row, where the inner pad row is adjacent the outer die pad row. Hence, if N equals 3 then 2 die pads of the die pad group G are repositioned on the inner die pad row. Hence, it will be apparent that the subgroup of the common die pad group G comprises all but one of the pads of the common die pad group G. The subgroup of N−1 die pads is positioned adjacent to the common die pad remaining in the outer row. Furthermore, the repositioning may include modifying a shape of a core area or active area of the semiconductor die layout.

After the repositioning block 330, an adjusting block 340 performs adjusting positions of at least some of the remaining pads in the outer die pad row thereby reducing an overall length of the outer die pad row. The adjusting positions performed at block 340 is characterized by maintaining a minimum bond wire pitch spacing between each of the die pads on the outer die pad row. It should be noted that the adjusting positions may include modifying a shape of the core area or active area of the semiconductor die layout. Furthermore, the adjusting positions performed at block 340 may include adjusting positions of the subgroup of N−1 die pads of the die pad group G on the inner die pad row in order to meet the minimum bond wire pitch spacing between each of the die pads on the outer die pad row.

At repeating decision block 350, the method 300 determines if the steps of blocks 310 to 340 should be repeated. The repeating decision block 350 determines if: a) the surface area of a pad limited semiconductor die cannot be reduced any further by the step of adjusting positions of block 340; or b) every common die pad group G, on every one of the outer die pad rows, has been selected by the selecting step of block 320. Thus, the method 300 performs repeating the above steps (of blocks 310 to 340) until the surface area of a pad limited semiconductor die cannot be reduced any further or until every common die pad group, on every one of the outer die pad rows, has been selected.

After the repeating decision block 350 determines that the method 300 cannot repeat the above steps (of blocks 310 to 340), a decision block 360 determines if the dimensions (surface area) of the semiconductor die has been reduced. If there has been no reduction in the semiconductor die surface area then the method 300 terminates at an end block 390. However, if there has been a reduction in the semiconductor die surface area then, at an adjusting block 370, a further step of adjusting pad rail lengths on the semiconductor die to conform with the reduced overall lengths of one or more die pad rows is performed. This adjustment of the pad rail lengths on the semiconductor die is characterized by the pad rails lengths being aligned under respective outer die pad rows as will be apparent to a person skilled in the art. Also, at a further adjusting block 380, an adjustment of clamps and triggers, if required, is performed after which the method 300 terminates at the end block 390.

Figure 4:
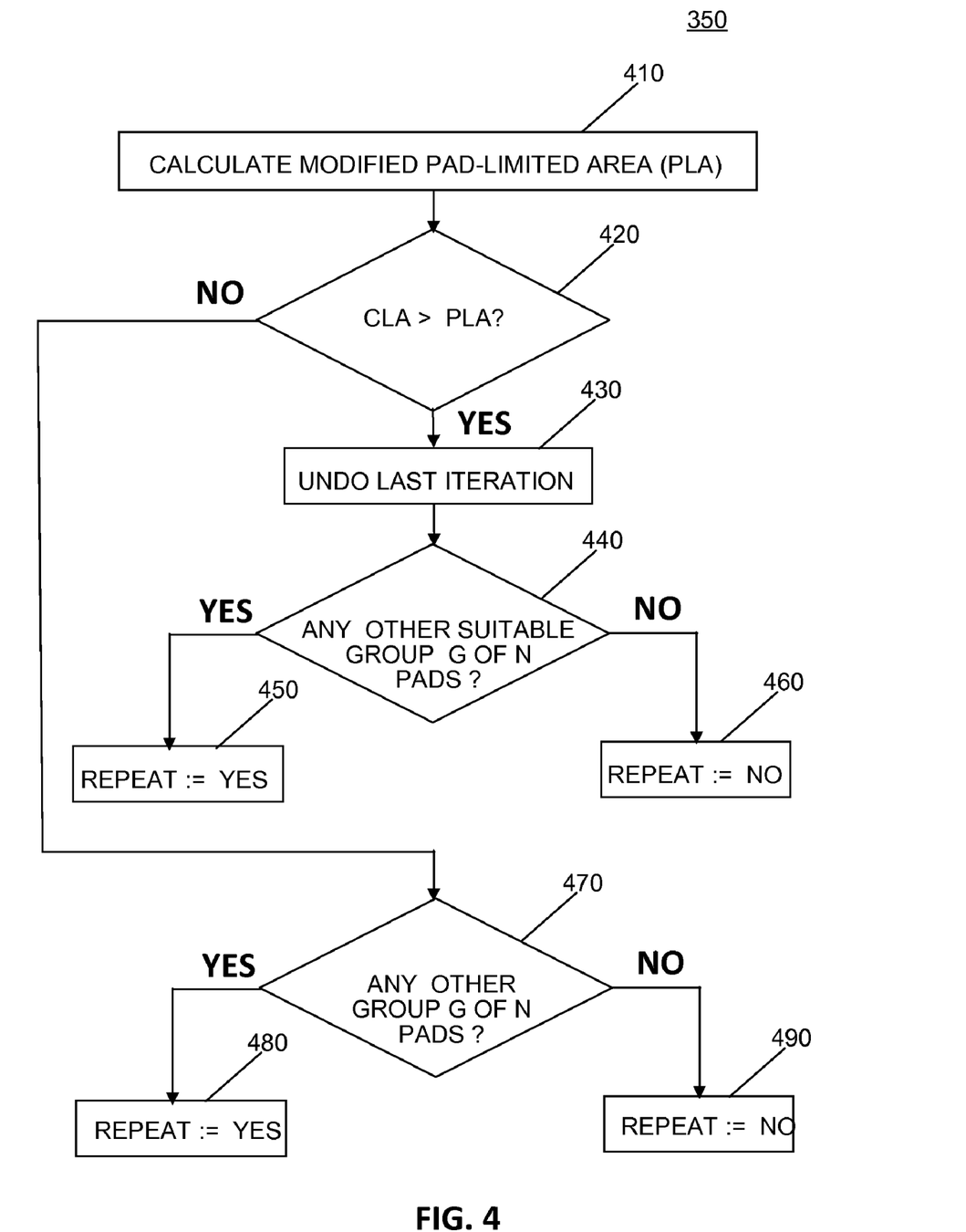
FIG. 4 is a flow chart illustrating details of a decision process performed by a repeating decision block of FIG. 3 in accordance with one preferred embodiment of the present invention.

Referring to FIG. 4 there is a flow diagram illustrating details of the decision process performed by the repeating decision block 350 in accordance with one preferred embodiment of the present invention. The decision process starts at a calculating block 410 in which a calculation of a modified pad limited area (PLA), as a result of the adjustment of the die pads, is performed one or more times by the adjusting block 340. In this regard, as will be apparent to a person skilled in the art, the pad limited area PLA is calculated (determined) by the minimum semiconductor die periphery required to accommodate the outer die pad rows. Next, a comparing decision block 420 compares a core limited area (SCA) of the semiconductor die with the pad limited area PLA. In this embodiment, the core limited area SCA is either known before the method 300 commences or alternatively it is calculated once at the commencement of the method 300. If the core limited area SCA is greater than the pad limited area PLA the last iteration is undone at a block 430 in which the last repeating of the steps of blocks 310 to 340 should be undone (canceled) and thereafter, at a test block 440, it is determined if any other suitable group G of N die pads are available for selection. In this regard, any other suitable group G of N die pads can be selected from any outer die pad row, however, priority is given to a suitable group G in the same die pad row SDR that was chosen at the choosing block 310 iteration that has been cancelled. More specifically, a suitable group G in the same die pad row SDR must have less die pads than that of the group that was selected at the selecting block 320 of the cancelled iteration. If the test block 440 determines that there is a suitable group G then a repeat result of YES, at block 450, is returned to the decision process of the decision block 350. Alternatively, if the test block 440 determines that there is no suitable group G then a repeat result of NO, at block 460, is returned to the decision process of the decision block 350.

Returning to the comparing decision block 420, if the core limited area SCA not greater than the pad limited area PLA then a test block 470, determines if any other suitable group G of N die pads are available for selection. If the test block 470 determines that there is a suitable group G then a repeat result of YES, at block 480, is returned to the decision process of the decision block 350. Alternatively, if the test block 470 determines that there is no suitable group G then a repeat result of NO, at block 490, is returned to the decision process of the decision block 350.

From the above it will be apparent that the decision block 350 determines that the surface area of a pad limited semiconductor die cannot be reduced any further by comparing the core limited area CLA of the semiconductor die with a pad limited area PLA of the semiconductor die. Furthermore, the pad limited area is determined, after each repetition of the step of adjusting at the adjusting block 340, by the lengths of the outer die pad rows. In contrast, in this embodiment, the core limited area CLA is determined by an area of the semiconductor die allocated to the core circuitry (where the core area at least comprises transistors that perform the functionality of the semiconductor die).

Figure 5:
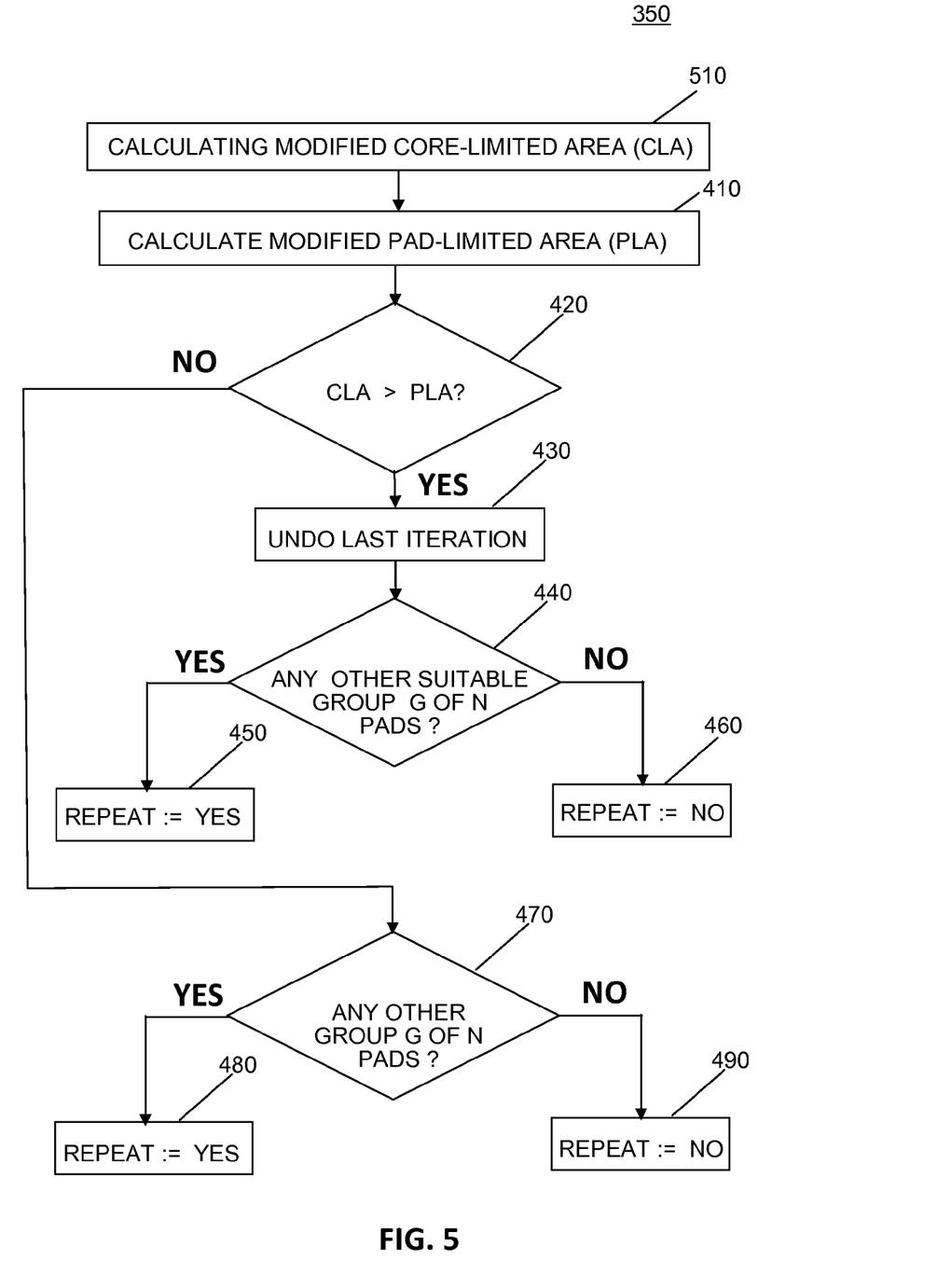
FIG. 5 is a flow chart illustrating details of a decision process performed by a repeating decision block of FIG. 3 in accordance with another preferred embodiment of the present invention.

Referring to FIG. 5 there is a flow diagram illustrating details of the decision process performed by repeating the decision block 350 in accordance with another preferred embodiment of the present invention. As most of the decision process details have been described above with reference to FIG. 4, a repetitive description of this process is not required for one of skill in the art to understand this embodiment and only the differences will be described. As shown, the only difference in this embodiment is the additional calculating block 510 that performs calculating the core limited area CLA. This calculating of the core limited area CLA is determined by adding an area of the semiconductor die allocated to core circuitry with areas allocated to each subgroup on an inner pad row. Thus, in this embodiment, the core limited area CLA increases during each adjusting step of adjusting block 340 by an amount equal to an area required to accommodate a currently selected group of pads that are repositioned on an inner pad row.

Figure 6:
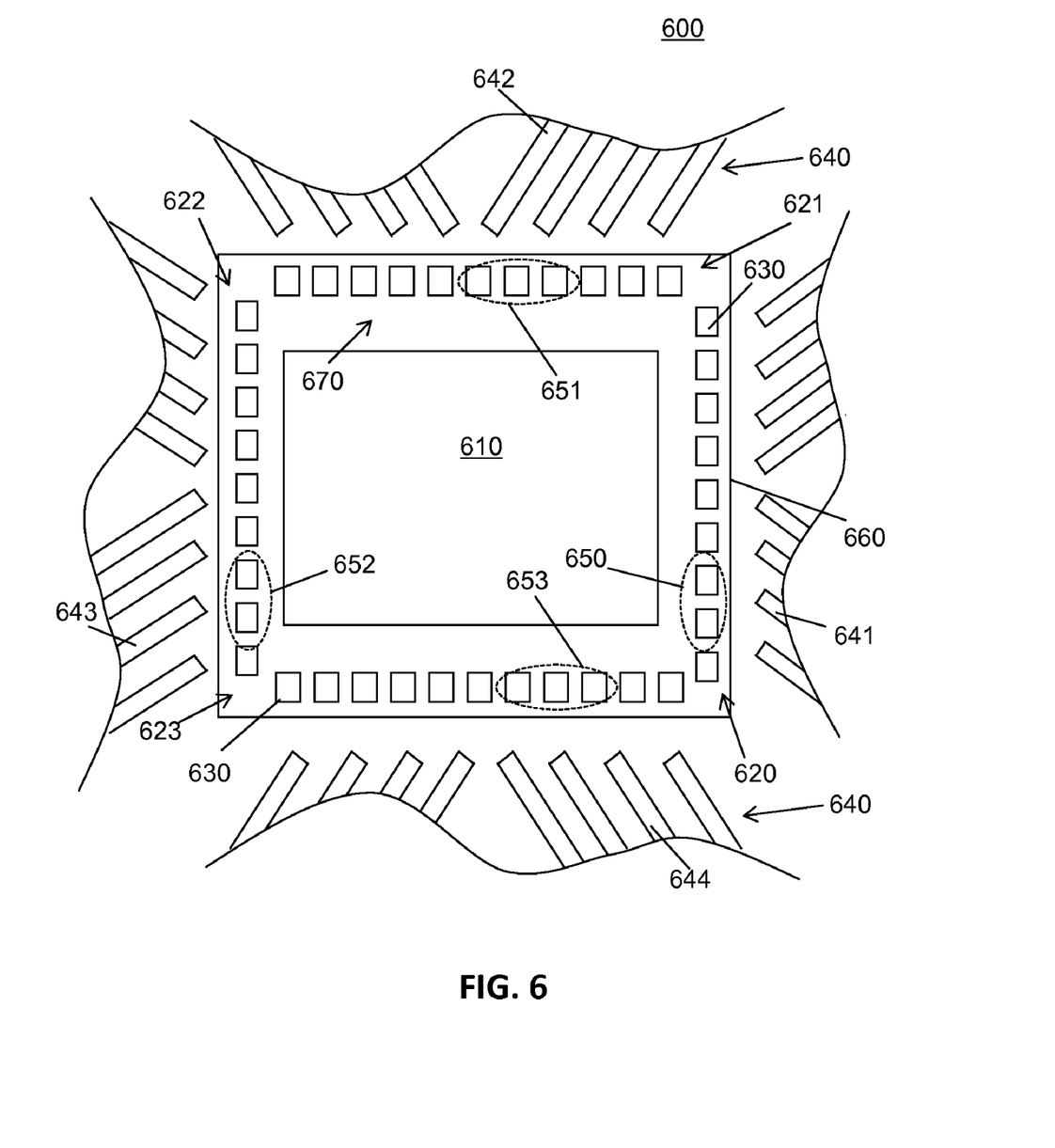
FIG. 6 is a plan view of an exemplary pad limited semiconductor die layout upon which the present invention can be performed.

Referring to FIG. 6 there is illustrated a plan view of an exemplary pad limited semiconductor die layout 600 upon which the present invention can be performed. The core limited semiconductor die layout 600 has an active area or core area 610 and spaced from the core area 610 are pad rows 620, 621, 622, 623 comprising die pads 630. Clearly, the lengths of the pad rows 620 determine the surface area of the semiconductor die layout 600 and if some of the die pads 630 were removed then the surface area of the semiconductor die layout 600 could be reduced. Associated with the semiconductor die layout 600 is a set of external connection pads 640 to which the die pads are to be electrically connected by wire bonds. There are also four common die pad groups 650, 651, 652, 652 associated with respective external connection pads 641, 642, 642, 644 that form part of the set of external connection pads 640. More specifically, the semiconductor die layout 600 has been designed so that common die pad group 650 is to be wire bonded to external connection pad 641, common die pad group 651 is to be wire bonded to external connection pad 642, common die pad group 652 is to be wire bonded to external connection pad 643 and common die pad group 653 is to be wire bonded to external connection pad 644. It will be apparent that there is an outer die pad row adjacent each edge 660 of the semiconductor die layout and there is a space 670 between the core area 610 and outer die pad rows 620, 621, 622, 623.

Figure 7:
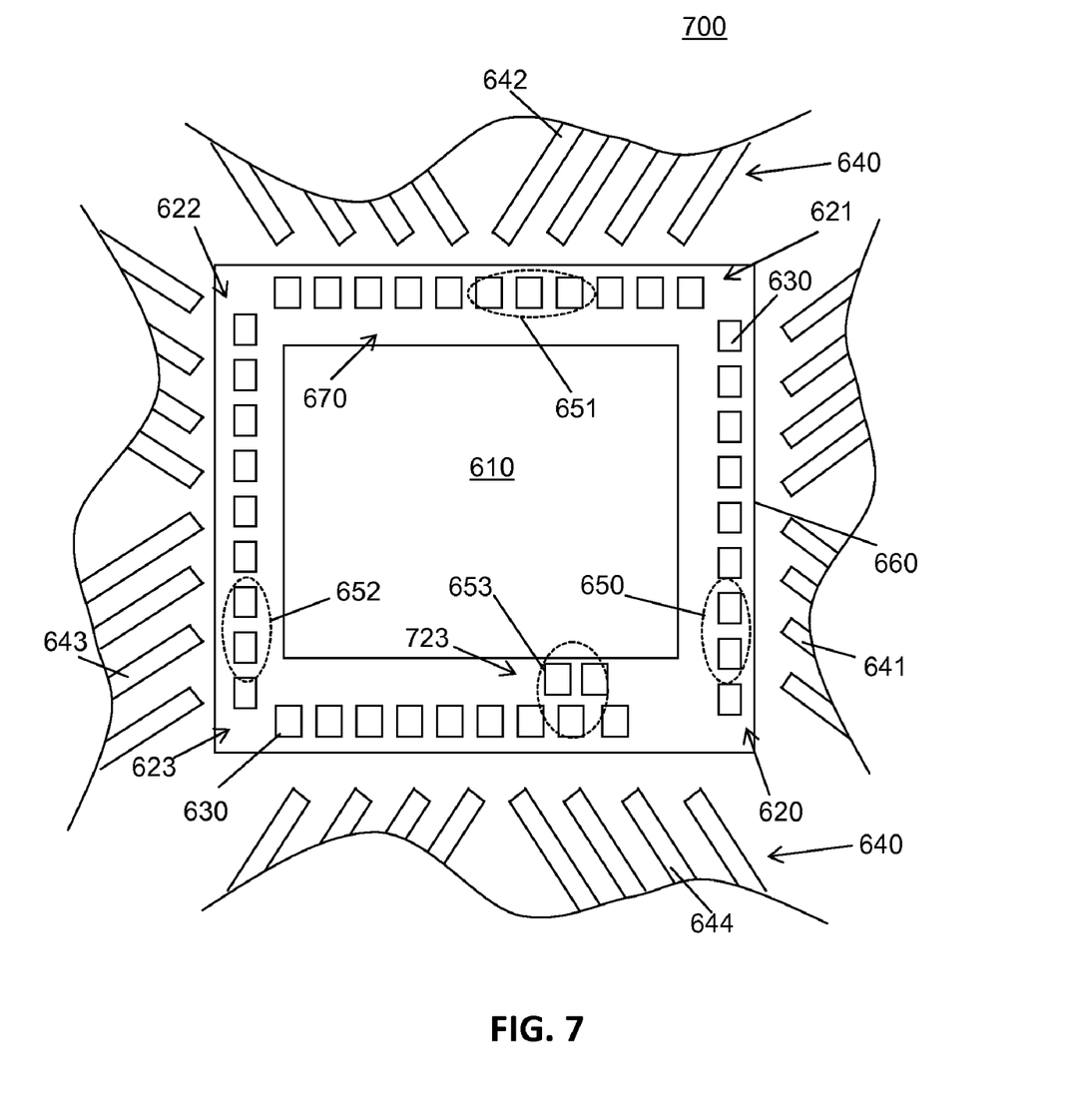
FIG. 7 is a plan view of a modified version of the exemplary pad limited semiconductor die layout of FIG. 6 after the method of FIG. 3 performs a first pass.

In FIG. 7 there is illustrated a plan view of a modified version 700 of the exemplary pad limited semiconductor die layout 600 after the method 300 performs a first pass (iteration) of the steps of blocks 310-340. More specifically, the method 300 has selected the common die pad group 653 and positioned two of the pads from this common die pad group 653 on an inner pad row 723 located in the space 670. Since, the pad limited area SPA is greater than the core limited area SCA, the method 300 again performs the steps of blocks 310-340.

Figure 8:
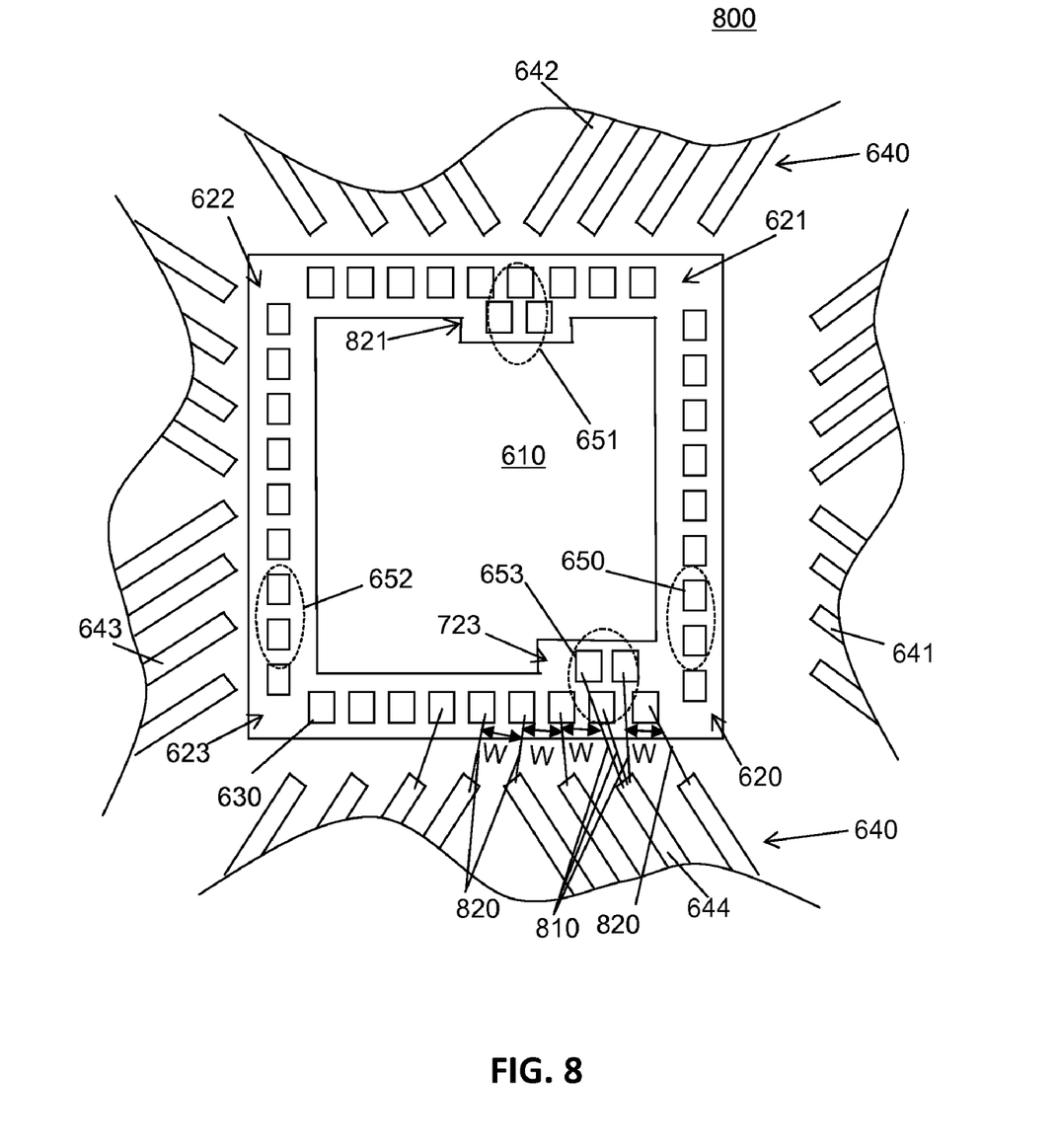
FIG. 8 is a plan view of a further modified version of the exemplary pad limited semiconductor die layout of FIG. 6 after the method of FIG. 3 performs a second pass.

In FIG. 8 there is illustrated a plan view of a further modified version 800 of the exemplary pad limited semiconductor die layout 600 after the method 300 performs the second pass (iteration) of the steps of blocks 310-340. In this second pass method 300 selects the common die pad group 651 and positions two of the pads from this common die pad group 651 on an inner pad row 821 located in the space 670.

As shown, since the lengths of the opposite outer die pad rows 621, 623 have been reduced, the surface area of a pad limited semiconductor die layout can be reduced. In this example, this reduced surface area is achieved by modifying the shape of the core area 610 but this is not always necessary. Any further passes of the steps of blocks 310-340 cannot reduce the surface area of a pad limited semiconductor die layout as there is virtually no usable space between the core area 610 and outer die pad rows 620, 621, 622, 623 to accommodate any more pads on an inner pad row.

The further modified version 800, also shows wire bonds 810 that will eventually electrically connect the common die pad group 653 to the external connection pad 644 and wire bonds 820 that will eventually electrically connect the die pads 630 of pad row 623 to their respective external connection pads 640. As illustrated, it can be seen that there is no need to adhere to the minimum bond wire pitch W for the pads in the common die pad group 653. In contrast, the minimum wire pitch W for the pads 630 is maintained as is the minimum wire W pitch between the pads 630 and any one of the pads in the common die pad group 653.

Advantageously, the present invention can be performed both on dies for Quad packages that have an outer die pad row adjacent each edge of the semiconductor die and also dies for on a Dual packages that have an outer die pad row adjacent only two opposing edges of the semiconductor die. The present invention therefore provides for the possibility of reducing sizes of pad limited semiconductor die sizes. More specifically, the present invention can, in certain circumstances, alleviate the problem of maintaining unnecessarily large semiconductor die areas due to positioning of subgroups on inner rows. The principle used in the choice and positioning of the subgroups is based on the lack of a requirement for bond wires, connecting pads to a single electrical external connection pad, do not need to follow wire separation/spacing (worst case or minimum pad pitch) rules. In other words, there is no need to adhere to the bond wire pitch rules for the pads in a common group (and re-positioned sub-group) since all the pads of the common chosen group will be electrically connected to a single external connection pads.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A method for reducing a surface area of a pad limited semiconductor die, the method comprising:
   choosing an outer die pad row from a group of outer die pad rows on the semiconductor die, each of the outer die pad rows being adjacent an edge of the semiconductor die;
   selecting, from the chosen outer die pad row, a common die pad group with die pads that are arranged to be electrically connected to a single external connection pad;
   repositioning a subgroup of the common die pad group on an inner die pad row, the inner pad row being adjacent the outer die pad row, wherein the die pads of the common die pad group are positioned with respect to each other such that a bond wire connecting the die pads of the common die pad group to the external connection pad have a spacing less than a minimum defined bond wire spacing for the semiconductor device;
   adjusting positions of at least some of the remaining pads in the outer die pad row thereby reducing an overall length of the outer die pad row;
   repeating the above steps until the surface area of a pad limited semiconductor die cannot be reduced any further by the step of adjusting positions or until every common die pad group, on all of the outer die pad rows, has been selected by the selecting step; and
   fabricating the semiconductor die with the reduced overall length of the outer die pad row.

2. The method for reducing a surface area of a pad limited semiconductor die of claim 1, wherein the choosing an outer die pad row includes choosing a longest outer die pad row from the group of die pad rows.

3. The method for reducing a surface area of a pad limited semiconductor die of claim 1, wherein the selecting prioritizes the selecting of a common die pad group comprising the most die pads.

4. The method for reducing a surface area of a pad limited semiconductor die of claim 1, wherein the common die pad group comprises power supply die pads.

5. The method for reducing a surface area of a pad limited semiconductor die of claim 1, wherein the common die pad group comprises signal or data die pads.

6. The method for reducing a surface area of a pad limited semiconductor die of claim 1, wherein the repositioning is characterized by the subgroup of the common die pad group including all but one of the common die pad group.

7. The method for reducing a surface area of a pad limited semiconductor die of claim 6, wherein the repositioning is further characterized by the subgroup being positioned adjacent the common die pad remaining in the outer row.

8. The method for reducing a surface area of a pad limited semiconductor die of claim 1, wherein the adjusting positions is characterized by maintaining a minimum bond wire pitch spacing between each of the die pads in the outer die pad row.

9. The method for reducing a surface area of a pad limited semiconductor die of claim 1, the method including a further step of adjusting pad rail lengths on the semiconductor die to conform with the reduced overall lengths of one or more die pad rows.

10. The method for reducing a surface area of a pad limited semiconductor die of claim 9, wherein the adjusting pad rail lengths on the semiconductor die is characterized by the pad rails lengths being aligned under respective outer die pad rows.

11. The method for reducing a surface area of a pad limited semiconductor die of claim 1, wherein there is an outer die pad row adjacent each edge of the semiconductor die layout.

12. The method for reducing a surface area of a pad limited semiconductor die of claim 1, wherein there is an outer die pad row adjacent each two opposite edges of the semiconductor die layout.

13. The method for reducing a surface area of a pad limited semiconductor die of claim 1, wherein when it is determined that the surface area of the pad limited semiconductor die cannot be reduced any further by comparing a core limited area of the semiconductor die with a pad limited area of the semiconductor die, then the pad limited area is determined after the step of adjusting.

14. The method for reducing a surface area of a pad limited semiconductor die of claim 13, wherein the pad limited area is determined, after each repetition of the step of adjusting, by the lengths of the outer die pad rows.

15. The method for reducing a surface area of a pad limited semiconductor die of claim 14, wherein the pad limited area is determined by the minimum semiconductor die periphery required to accommodate the outer die pad rows.

16. The method for reducing a surface area of a pad limited semiconductor die of claim 14, wherein the core limited area is determined by an area of the semiconductor die allocated to core circuitry.

17. The method for reducing a surface area of a pad limited semiconductor die of claim 14, wherein the core limited area is determined by adding an area of the semiconductor die allocated to core circuitry with one or more areas allocated to each subgroup on an inner pad row.

18. The method for reducing a surface area of a pad limited semiconductor die of claim 1, wherein the repositioning includes modifying a shape of a core area of the semiconductor die layout.

19. The method for reducing a surface area of a pad limited semiconductor die of claim 1, wherein the adjusting positions includes modifying a shape of a core area of the semiconductor die layout.

20. The method for reducing a surface area of a pad limited semiconductor die of claim 1, wherein the adjusting positions includes adjusting positions of pads of subgroup on the inner die pad row in order to meet a minimum bond wire pitch spacing between each of the die pads on the outer die pad row.

* * * * *